US007989055B2

(12) United States Patent
Keller et al.

(10) Patent No.: US 7,989,055 B2
(45) Date of Patent: Aug. 2, 2011

(54) SECURITY ELEMENT AND METHOD FOR PRODUCING THE SAME

(75) Inventors: Mario Keller, Bad Endorf (DE); Theo Burchard, Gmund (DE); Lars Hoffmann, Freising (DE)

(73) Assignee: Giesecke & Devrient GmbH, Munich (DE)

( * ) Notice: Subject to any disclaimer, the term of this patent is extended or adjusted under 35 U.S.C. 154(b) by 11 days.

(21) Appl. No.: 12/325,762

(22) Filed: Dec. 1, 2008

(65) Prior Publication Data

US 2009/0081428 A1 Mar. 26, 2009

Related U.S. Application Data

(62) Division of application No. 10/498,872, filed as application No. PCT/EP02/14418 on Dec. 17, 2002, now Pat. No. 7,479,320.

(30) Foreign Application Priority Data

Dec. 21, 2001 (DE) .................................. 101 63 380
Jun. 12, 2002 (DE) .................................. 102 26 116

(51) Int. Cl.
*B32B 7/02* (2006.01)

(52) U.S. Cl. .......... 428/212; 428/209; 428/916; 283/57; 283/72; 283/83; 156/230

(58) Field of Classification Search ............... 428/195.1, 428/209, 212, 916; 283/57, 58, 72, 83, 94, 283/107, 902; 156/230
See application file for complete search history.

(56) References Cited

U.S. PATENT DOCUMENTS

| | | | | |
|---|---|---|---|---|
| 4,943,093 | A * | 7/1990 | Melling et al. | 283/83 |
| 5,093,184 | A | 3/1992 | Edwards | |
| 5,388,862 | A * | 2/1995 | Edwards | 283/82 |
| 5,447,335 | A * | 9/1995 | Haslop | 283/91 |
| 5,573,639 | A * | 11/1996 | Schmitz et al. | 162/140 |
| 6,903,850 | B2 * | 6/2005 | Kay et al. | 359/2 |
| 2005/0104364 | A1 | 5/2005 | Keller et al. | |

FOREIGN PATENT DOCUMENTS

| | | | |
|---|---|---|---|
| EP | 0 400 902 | A2 | 12/1990 |
| EP | 1 023 499 | B1 | 5/2004 |
| HU | P0401237 | A | 9/2004 |
| RU | 2 060 167 | C1 | 5/1996 |
| WO | 9209444 | A1 | 6/1992 |
| WO | 9913157 | A1 | 3/1999 |
| WO | WO 0200446 | A1 * | 1/2002 |
| WO | 02070278 | A2 | 9/2002 |

* cited by examiner

*Primary Examiner* — Mark Ruthkosky
*Assistant Examiner* — David J Joy
(74) *Attorney, Agent, or Firm* — Rothwell, Figg, Ernst & Manbeck, P.C.

(57) ABSTRACT

The invention relates to a security element for security papers, bank notes, ID cards or the like, having at least one plastic layer on which at least two metal layers of different color are so disposed side by side and on the same side of the plastic layer that the different colors are visually checkable.

26 Claims, 6 Drawing Sheets

SECURITY ELEMENT AND METHOD FOR PRODUCING THE SAME

CROSS-REFERENCE TO RELATED APPLICATIONS

This application is a divisional of U.S. application Ser. No. 10/498,872, now U.S. Pat. Ser. No. 7,479,320, filed Jun. 16, 2004, which is a National Phase of International Application Serial No. PCT/EP02/14418, filed Dec. 17, 2002, and claims priority of German Patent Application No. 10163380.7, filed Dec. 21, 2001 and German Patent Application No. 10226116.4, filed Jun. 12, 2002, the contents of which are hereby incorporated by reference.

FIELD OF THE INVENTION

This invention relates to a security element for security papers, bank notes, ID cards or the like, and to a security paper and document of value having such a security element. Further, the invention relates to methods for producing the security element and the security paper and document of value having such a security element.

DESCRIPTION OF THE BACKGROUND ART

EP 0 330 733 A1 proposes a security thread that is testable both visually and by machine. For this purpose a transparent plastic foil is coated metallically and this coating provided with gaps in the form of characters or patterns. Furthermore, the security thread contains in the areas congruent with the gaps chromophoric and/or luminescent substances that cause the characters or patterns to differ in color contrast from the opaque metal coating under suitable light conditions. The metal layer used is preferably an aluminum layer. This security thread is embedded in security papers as a so-called "window security thread," i.e. it is quasi woven into the paper during sheet formation of the security paper so that it is freely accessible on the surface of the paper at regular intervals and completely embedded in the paper only in the intermediate areas.

This security thread already meets a very high security standard. The continuous metallic coating permits machine testing of electric conductivity, while the gaps serve as a visual authenticity feature readily recognizable to the viewer in transmitted light. In addition, the thread has an additional feature not readily recognizable to the viewer, namely the luminescence in the area of the gaps, which is likewise testable by machine. When bank notes having such a security thread are viewed fleetingly, however, the metallic luster of the window areas is primarily striking. This luster can be imitated by simply gluing aluminum foil elements. Upon a fleeting check solely in reflected light, such forgeries could therefore be taken for authentic bank notes.

SUMMARY OF THE INVENTION

The invention is therefore based on the problem of proposing a security element as well as a security paper and document of value that have elevated forgery-proofness in comparison to the prior art.

According to the invention, the security element has at least two metal layers of different color that are disposed on the same surface of the security element and are preferably directly adjacent at least in certain areas. The optical impression of such a security element can be imitated, if at all, only with very high effort, in particular if the different-colored metal layers are applied in complicated patterns, which are possibly also intertwined. For example, a multicolor metallic picture motif composed of different-colored metals can be produced. The metal layers are preferably disposed in this connection on a plastic layer that is part of the security element.

The metal layers need not be disposed in one plane of the security element but can be disposed one above the other at least in certain areas. The visible color effect can then be varied via the layer thickness of the metal layers. If at least the layer thickness of the upper layer is selected so thin that it is translucent, the viewer perceives the mixed color of the two metal layers.

The two metal layers can also be disposed one above the other over a large surface, whereby gaps where the lower metal layer is visible are incorporated in the upper metal layer in certain areas by additional measures. If the lower metal layer also has interruptions that are preferably offset from the gaps in the upper layer, and the security element is disposed so that it is observable on both sides, two different-colored metal layers can be perceived from each side.

Analogously, three and more metal layers can also be disposed one above the other and exposed in certain areas by special measures. The metal layers do not necessarily all have to be disposed on the same surface of the security element in this connection. The metal layers do not all need to have a different inherent color either. The color effect can also be determined by printing a transparent ink.

The metals may be for example aluminum, chrome, nickel, copper, gold, silver or other nonferrous metals or colored metal alloys. Metallic-looking compounds, such as gold-colored titanium nitride, can also be used.

A further possibility for increasing forgery-proofness is to use metals with different physical properties, in particular different magnetic or electric properties. For example, iron and aluminum differ both in their color and in their magnetic properties. This difference can be detected by measurement technology and therefore serves as a machine-detectable authenticity feature.

Forgery-proofness can be increased additionally if the metal layers have gaps in the form of alphanumeric characters, patterns, logos or the like.

The security element can be a security thread that consists of a self-supporting plastic foil to which the different-colored metal layers are applied. This security thread can be incorporated at least partly in a security paper or security document. However, it is also possible to form the security element in the form of a band or label and fasten it to the surface of the security paper or document of value.

The plastic foil of the security element can moreover be provided with diffraction structures in the form of a relief structure. The diffraction structures can be any diffractive structures such as holograms or grid structures (e.g. Kinegrams®, pixelgrams) or the like.

Alternatively, the security element can also be executed as a transfer element. This variant is especially advantageous if the security element is disposed completely on the surface of the security paper or document of value. In this case the layer structure of the security element is prepared on a carrier foil, usually a plastic foil, and then transferred to the security paper or document of value in the desired contours by a hot embossing method.

With this security element too, a diffraction structure can of course be integrated into the layer structure of the security element. In addition, the security element can have further security features, such as a thin-film structure, printed image or the like.

If the security element is disposed on the surface of the security paper or document of value, it can have any outline structures, for example round, oval, star-shaped, rectangular, trapezoidal or strip-shaped contours.

According to a preferred embodiment, the security paper or document of value to which the security element is applied has a through opening. The security element is disposed in this connection in the area of the opening and protrudes beyond it on all sides. In this case the security element is checkable from the front and back. The different metals are likewise recognizable from both sides, absolutely "congruently." Imitation of the color effect is therefore especially difficult or fully ruled out in this embodiment.

The use of the inventive security element is not limited to the field of security documents, however. The inventive security element can also be used advantageously in the field of product protection for protecting any goods from forgery. For this purpose, the security element can have additional anti-theft elements, for example a coil or chip. This applies analogously to the security paper or document of value provided with such a security element.

The metal layers are preferably applied with a vapor deposition unit, the individual metallic areas each being produced by masks. If more than two metal layers are used, individual metal layers can be produced by printing metallic inks or metal-pigmented inks.

The gaps are preferably produced in the particular metal layers by a washing method as described in WO 99/13157, which is incorporated herein by reference. The security elements are prepared in this connection as a security foil having a plurality of copies of the security element. The basic material forms a self-supporting, preferably transparent plastic foil. This plastic foil corresponds in the case of security threads or labels to the inventive plastic layer of the security element. When the security elements are detached from an embossed foil, the plastic foil forms the carrier material of this transfer material to which the plastic layer is applied for example in the form of a lacquer layer. Diffraction structures can be embossed into this lacquer layer or, in the case of security threads or labels, into the plastic foil. The inventive plastic layer of the security element is printed in the form of the later gaps preferably by intaglio printing. For this purpose an ink with a high pigment content is used that forms a pored, raised inking. The different-colored metal layers are then vapor-deposited on the printed plastic layer, optionally using masks. In a last step, the inking and the metal layer thereabove are finally removed by washing out with a fluid, possibly combined with mechanical action. A water-soluble ink is preferably used so that water can be used as the fluid. This method thus is non-polluting and does not require any special precautions. This method further has the advantage that the gaps are produced for both or a plurality of metal layers in one operation. Washing out can be supported by mechanical means such as a rotating cylinder, brush or ultrasound.

The use of etching techniques is much more elaborate but in principle likewise possible. Here the metal layers are first deposited on the plastic layer and the total surface then printed with a protective lacquer layer except for the areas to be removed. The total security element layer structure is then passed through an etching bath where the uncovered areas are detached from the plastic layer. If different etching baths are necessary for the different metals, the process of covering and immersing in an etching bath must be repeated with different etching solutions. Neutralization and cleaning baths are to be provided between the individual etching baths so that the chemicals of the individual baths are not contaminated.

A further possibility is to produce the gaps in the metal layers galvanically by electrolysis. Here the metal layers are likewise first deposited on the plastic layer and a passivation layer then printed in the remaining metallic areas. The security element layer structure is finally passed through an electrolytic bath using the metal layer as a cathode. The electrolytic solution and voltage to be used is to be coordinated with the metals used. Here, too, it might be necessary to use different electrolytic solutions for the different metals. The principle of this method is known to the expert and explained in more detail e.g. in WO 00/02733, which is likewise incorporated herein by reference.

Other methods are likewise possible, such as removing the metal layer areas mechanically, or producing the interruptions by means of laser scriber, electron-beam erosion or other removal methods.

Luminescent substances, liquid-crystalline substances, metallic printing inks or metal bronzes can be disposed in the metal-layer-free intermediate areas and serve as a further authenticity feature.

BRIEF DESCRIPTION OF THE DRAWINGS

Further embodiments and advantages of the inventive security element, security paper and document of value will be explained with reference to the figures. The representations are schematized and do not correspond to the actual ratios of size and proportions.

DETAILED DESCRIPTION OF THE INVENTION

Figure 1:
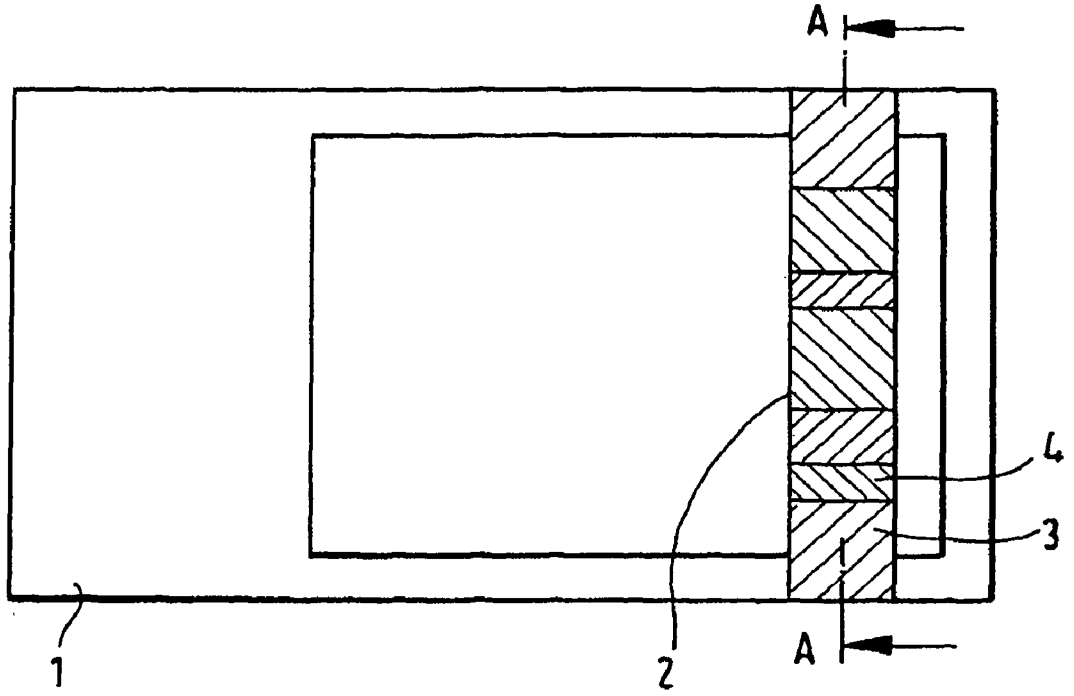
FIG. 1 shows an inventive document of value.

FIG. 1 shows an inventive document of value in a top view. The shown example involves bank note 1. Said bank note has strip-shaped security element 2 extending over the total width of bank note 1. The total surface of security element 2 facing the viewer is metallic, areas 3, 4 bearing different-colored metals, which are directly adjacent and disposed alternatingly in the shown example.

The security element shown in FIG. 1 is a diffractive security element consisting of an embossed plastic layer and at least one metallic reflective layer.

Figure 2:
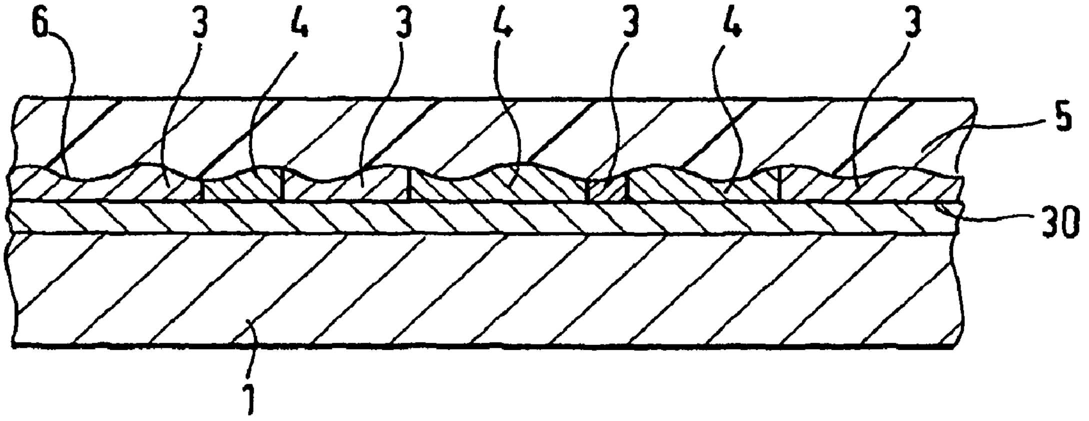
FIG. 2 shows a cross section through the inventive document of value along line A-A.

FIG. 2 shows a cross section along line A-A in FIG. 1. Here one can see plastic layer 5 in which diffraction structure 6 is incorporated. Different-colored metal layers 3, 4 are disposed alternatingly directly adjacent therebelow. The layers of the security element are fastened to the document of value via adhesive layer 30 in the shown example.

Figure 3:
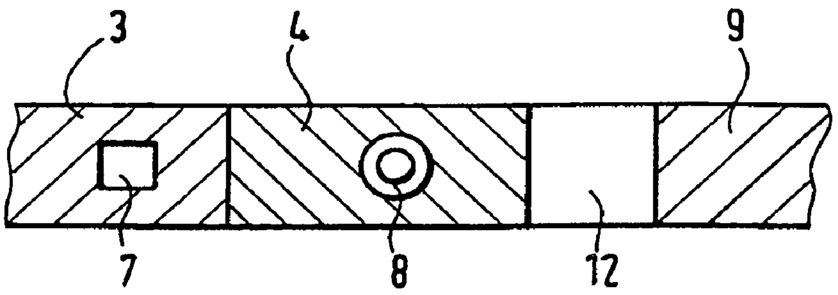
FIG. 3 shows an inventive security element in a top view.

FIG. 3 shows a further embodiment of an inventive security element in a top view. Here, additional gaps 7, 8 are disposed in different metallic areas 3, 4. These gaps may show any signs, alphanumeric characters, patterns, logos or the like. Further, only metallic areas 3, 4 are directly adjacent. Between metallic areas 4 and 9 there is large nonmetallic space 12. Likewise metallic area 9 can bear a metal having a third inherent color different from the inherent colors of the metals in areas 3, 4.

Figure 4:
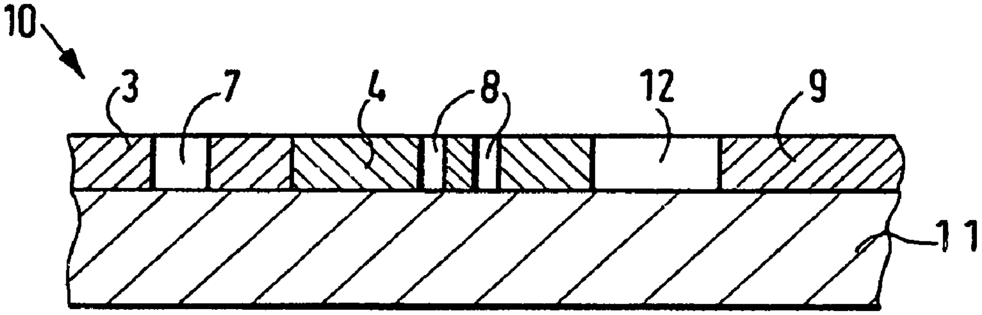
FIG. 4 shows the layer structure of an embodiment of the security element shown in FIG. 3 in cross section.
Figure 5:
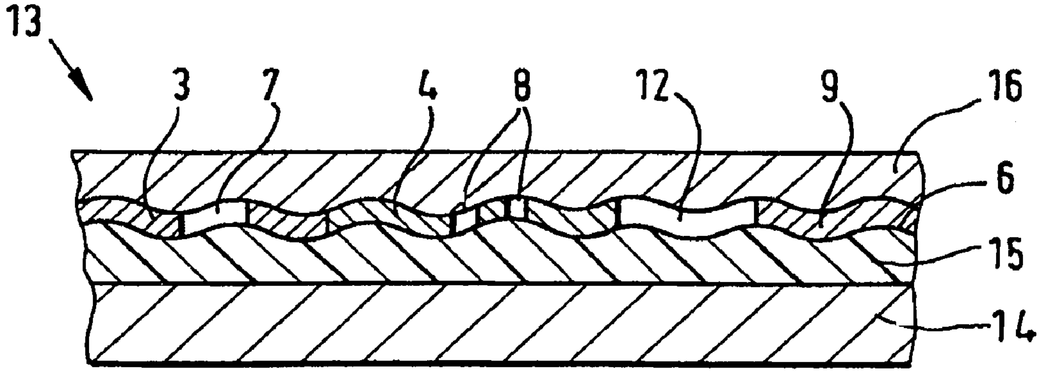
FIG. 5 shows an inventive transfer material in cross section.

The security element shown in FIG. 3 can be for example security thread 10, as shown in cross section in FIG. 4. Security thread 10 consists of preferably transparent carrier foil 11 on which different-colored metal layers 3, 4, 9 are disposed.

The same appearance as in FIG. 3 can also be shown by a transfer material used for producing security elements on security papers, documents of value or the like. Transfer material 13 consists of carrier foil 14 to which plastic layer 15 is applied. Diffraction structures 6 are incorporated in the form of a relief structure in plastic layer 15. Different-colored metal layers 3, 4, 9 are disposed thereabove. Finally, transfer material 13 also has optional adhesive layer 16 that is activated by heat and pressure in the areas to be transferred upon transfer to the corresponding security paper or document of value for fastening corresponding metal layers 3, 4, 9 and plastic layer 15 to the security paper or document of value. In a last step, carrier foil 14 is removed.

In gaps 7, 8 and space 12 adhesive layer 16 is directly adjacent to diffraction structure 6. If adhesive layer 16 and plastic layer 15 have a very similar refractive index, diffraction structure 6 is no longer to be recognized in these areas.

If required by the specific application of the security element, removal of the carrier foil can be dispensed with. The carrier foil can in this connection be equipped with good adhesive properties by additional measures.

If the security thread shown in FIG. 4 is likewise to have a diffraction structure, the latter can be incorporated in carrier foil 11 or a separate plastic layer disposed between carrier foil 11 and metal layers 3, 4.

Figure 6A:
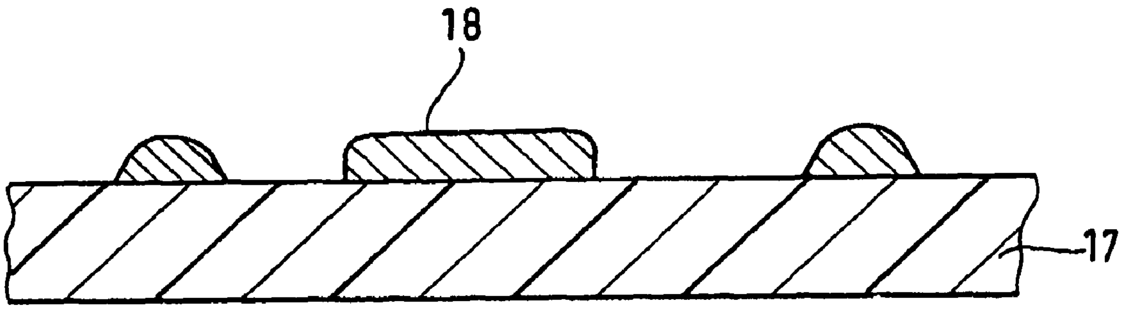
FIG. 6 shows a method for producing an inventive security element.
Figure 6B:
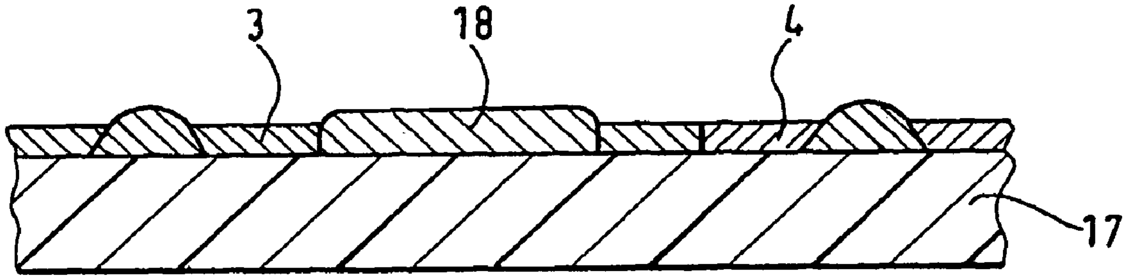

FIG. 6 shows schematically the method for producing an inventive security element whose metal layers are provided with gaps in certain areas. The method will be explained by way of example for security threads or labels, but can of course be used analogously for security elements with other layer sequences. The security elements are preferably produced as a security foil having a plurality of copies of the security element. The starting point in the example shown here is self-supporting plastic foil 17. It is printed in a first step with highly pigmented ink 18 in the areas where the gaps are later to be present so that a large-pored print arises, as shown in FIG. 6*a*). Different-colored metal layers 3, 4 are then applied over total printed plastic foil 17 in the desired form. For this purpose a vapor deposition method is preferably used by which individual metals 3, 4 are vapor-deposited on plastic foil 17 successively using masks. In the area of print 18 no contiguous metal layer is formed due to the porous surface structure of the ink. The intermediate product provided with metal layers 3, 4 is shown in FIG. 6*b*).

Figure 6C:
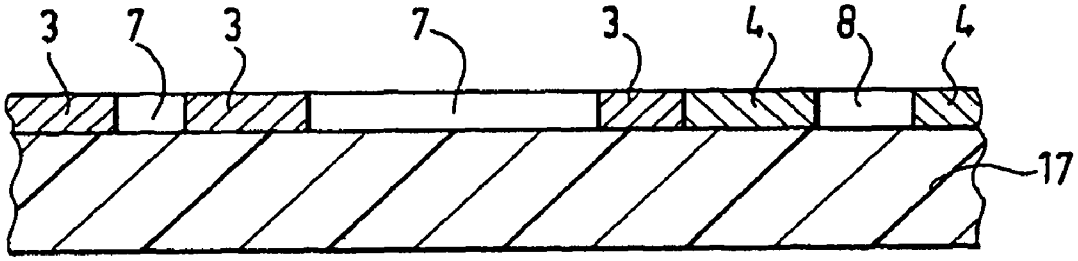

Since no solid metal surface forms in the area of print 18, print 18 and metal layers 3, 4 present in this area can be removed virtually without effort by washing out. Water is preferably used for washing out. It might be necessary to additionally use brushes that ensure complete removal of print 18. The final product is shown in FIG. 6*c*). Metal layers 3, 4 have gaps 7, 8. The security foil can finally be cut into security elements of the desired form.

The washing method offers the advantage of obtaining sharp and defined edge contours, so that this method can also produce very fine high-resolution characters or patterns in the metal layers.

In the described examples the surface areas of different metals are preferably disposed side by side. Despite this the metal layers can also be disposed one above the other or in partial overlap. It is only important that side-by-side metal areas of different color or structure are recognizable upon visual viewing. This is important because it can be helpful during application of the metal layers if the first metal layer can be disposed over the whole area, the second on partial areas of the first, the third over the whole or part of the area on one or both preceding layers, etc. This reduces register problems and simplifies the use of marks.

Figure 7:
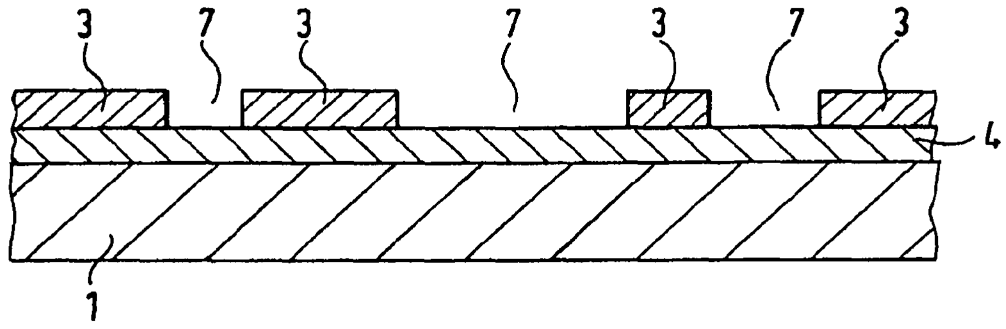
FIG. 7 shows a further variant of the document of value according to FIG. 1 in cross section along A-A.

FIG. 7 shows a corresponding embodiment of the document of value shown in FIG. 1 in cross section along line A-A. In this case security document 1 is provided in the area of security element 2 with all-over metal layer 4 and metal layer 3 provided only in certain areas so that metal layer 4 is recognizable in areas 7. Gaps 7 can likewise be produced by the "washing method" described above with reference to FIG. 6. This method is recommendable in particular when different-colored metal layers 3, 4 are prepared on a separate carrier and then transferred to the document of value or document substrate. Any other methods for producing the gaps can of course likewise be used. Special mention should also be made in this context of the removal method by means of a laser beam. Here, metal layers 3, 4 are first applied to the document of value or a carrier all over. Metal layer 3 is then subjected in the area of gaps 4 to a laser beam that removes metal layer 3 in these areas without damaging metal layer 4.

Figure 8:
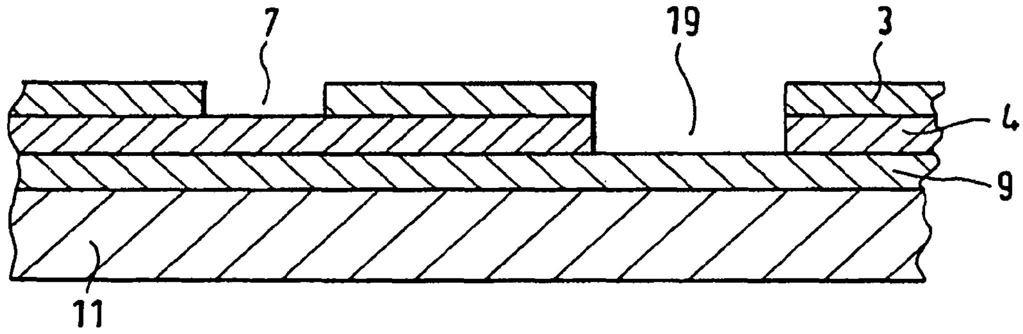
FIG. 8 shows an inventive embodiment of a security element in cross section.
Figure 9:
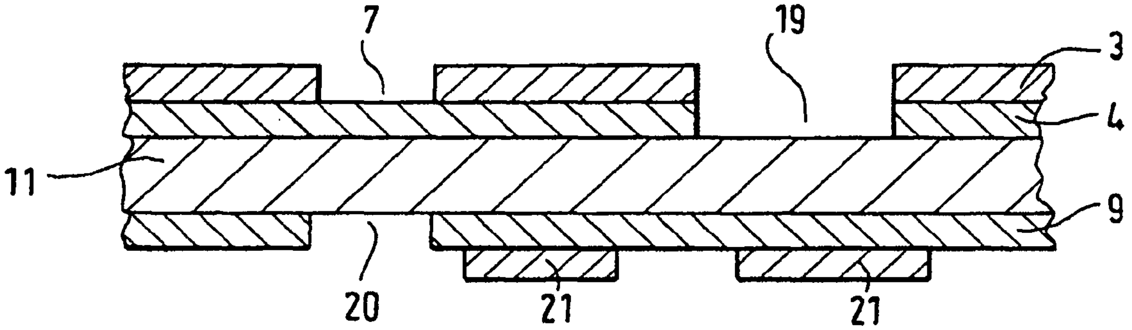
FIG. 9 shows a further inventive embodiment of a security element in cross section.

FIGS. 8 and 9 show further embodiments of the inventive security element provided with three different-colored metal layers. This variant is suitable in particular for application as a security thread, but is not limited thereto.

In security thread 10 shown in FIG. 8, carrier foil 11 is provided all over with metal layer 9 having a first color. Metal layers 3 and 4, whose inherent color differs from metal layer 9, are applied thereabove. Metal layers 3 and 4 are provided only in certain areas and can have congruent gaps 19 in which metal layer 9 is visible. Additionally, metal layer 3 can have gaps 7 where metal layer 4 is visible.

FIG. 9 shows an embodiment wherein metal layer 9 is disposed on the opposite surface of carrier foil 11. In the example shown here, metal layer 9 also has gaps 20. In the example shown here, metal layer 9 can also consist of the same material as one of metal layers 3, 4. If metal layer 9 is also to have a special inherent color at least in certain areas, it can be printed with transparent color lacquer layer 21.

Figure 10:
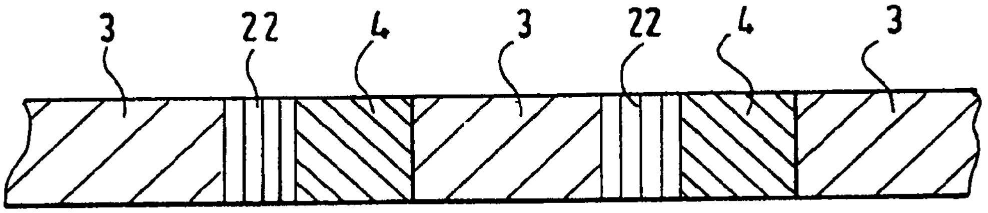
FIG. 10 shows a further inventive embodiment of a security element in a top view.

FIG. 10 shows a further embodiment of an inventive security element in a top view. The security element has in this case two different-colored metal layers 3, 4 and further printed image 22 that are disposed in register. Such a security element is preferably produced by the above-described washing method.

Figure 11A:
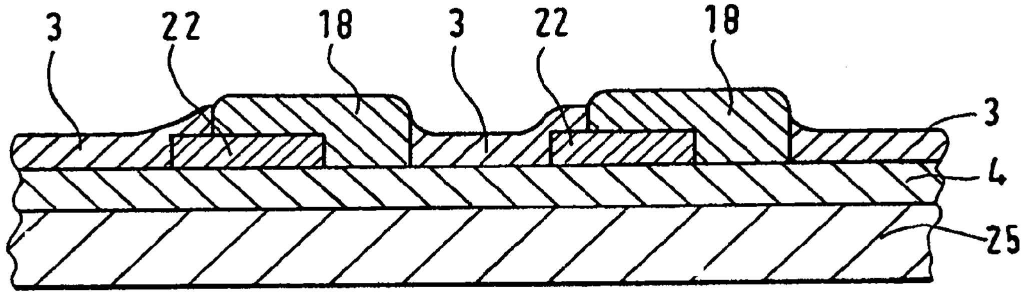
FIG. 11 shows a method for producing the security element according to FIG. 10.
Figure 11B:
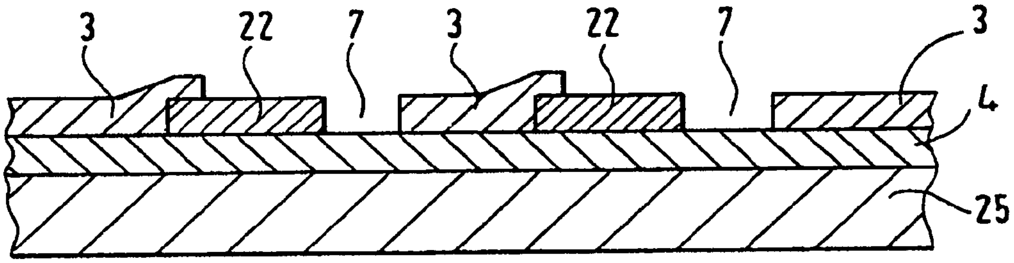

For this purpose a layer structure as shown in FIG. 11*a* is prepared on carrier material 25. In a first step, metal layer 4 is applied to carrier material 25 all over. In a next method step, printed image 22 is printed. Washing ink 18 is applied preferably in overlap and in any case in register with color layer 22. Metal layer 3 is finally vapor-deposited on this layer structure all over in a further vapor-depositing step. During the washing operation washing ink 18 is removed, thereby exposing the areas of printed image 22 covered by said ink, and metal layer 4. FIG. 11*b* shows this layer structure in cross section.

Figure 12A:
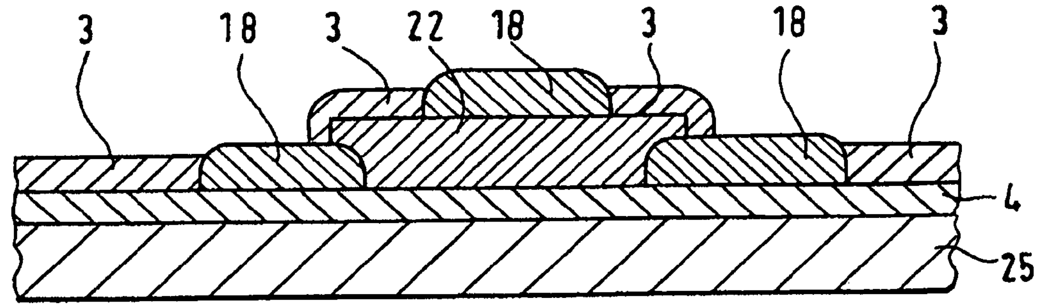
FIG. 12 shows a method for producing an inventive security element.
Figure 12B:
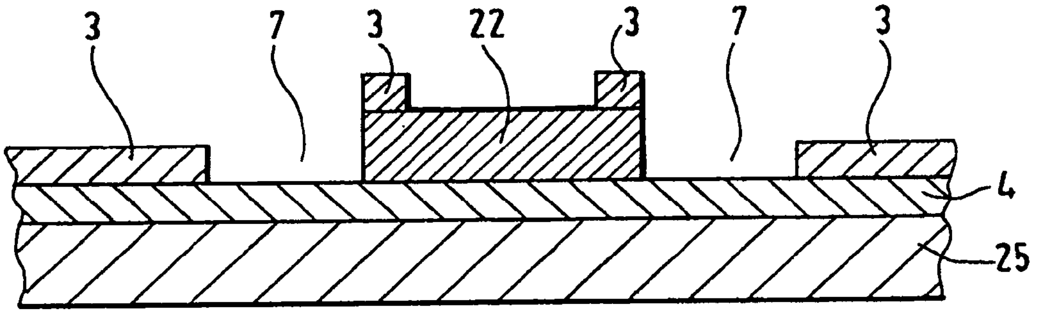

To avoid register problems it might also be expedient to dispose printed image 22 in the fringe area over washing ink 18, as shown in FIG. 12. During the washing operation the washing ink is dissolved and removed partly mechanically, thereby also removing the ink thereabove. This makes it possible to produce interpenetrating surfaces of different metallic color which can additionally be disposed in register with other colored printed images. Alternatively, however, printed image 22 can also be disposed under the washing ink.

Figure 13:
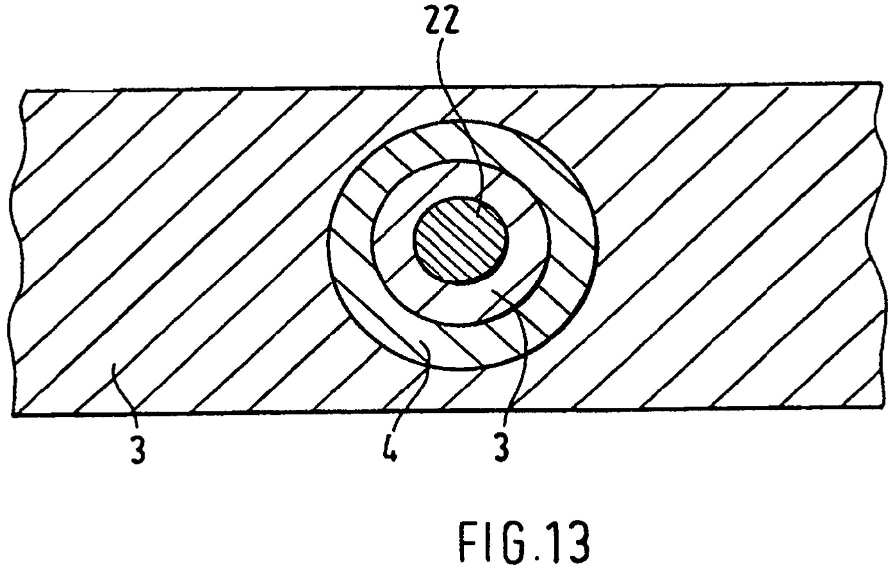
FIG. 13 shows a security element produced by the method according to FIG. 12 in a top view.

FIG. 13 shows such a security element after the washing operation in a top view. Here, three circular areas are disposed concentrically. Printed image 22 is disposed in the innermost area. Printed image 22 is surrounded by a circular area of metal layer 3 having a first inherent color. This is in turn enclosed by a likewise circular area with metal layer 4. The total area surrounding metal layer 4 is in turn formed by metal layer 3.

Printed image 22 can consist only of a color layer or else be a complicated multicolor printed image in the examples shown. This printed image can also be formed using any inks, such as UV-curable inks, metallic inks or inks with luminescent or optically variable pigments added.

Likewise, the contour forms of the metal layers or printed images shown are not limited to the simple geometrical forms shown. Any complicated motifs are possible. The different metal layers can also be separated by demetalized or unmetalized areas.

Likewise, the embodiments shown can be combined with any further security features, for example diffraction structures or liquid-crystalline layers.

Finally, the layer sequences shown can also be transferred to any embodiments of the security element used. Thus, the layer sequences shown with reference to security threads can be transferred analogously to transfer materials or label materials and vice-versa.

The invention claimed is:

1. A security element for a security document, having at least one plastic layer on which at least two metal layers of different color are so disposed on the same side of the plastic layer that two different colors are visually recognizable and that the metal layers are disposed in one plane, side-by-side, and none of the metal layers overlap another one of the metal layers.

2. A security element according to claim 1, wherein the metal layers are adjacent at least in certain areas.

3. A security element according to claim 1, wherein at least one of the metal layers has gaps in the form of alphanumeric characters, patterns, or logos.

4. A security element according to claim 1, wherein a third metal layer with a third color is provided that is likewise disposed on the same surface or the opposite surface of the plastic layer.

5. A security element according to claim 1, wherein the color of one of the metal layers is produced by printing a transparent colored lacquer layer.

6. A security element according to claim 1, wherein the security element has a printed image.

7. A security element according to claim 1, wherein the metals have different physical properties that are testable by machine.

8. A security element according to claim 1, wherein at least one of the metal layers is semitransparent.

9. A security element according to claim 1, wherein the plastic layer has a diffraction structure in the form of a relief structure.

10. A security element according to claim 1, wherein the plastic layer is a self-supporting plastic foil.

11. A security element according to claim 1, wherein the plastic layer is disposed on a carrier material.

12. A security element according to claim 1, wherein the security element is a transfer element.

13. A security element according to claim 1, wherein the security element is a self-supporting label.

14. A security element according to claim 1, wherein the security element has round, oval, star-shaped, rectangular, trapezoidal or strip-shaped contours.

15. A security element according to claim 1, wherein the security element is a security thread.

16. A security paper for producing documents of value, wherein it has at least one security element according to claim 1.

17. A security paper according to claim 16, wherein the security element is a security thread at least partly embedded in the security paper.

18. A security paper according to claim 17, wherein the security paper has a through opening, the security element being disposed in the area of the opening and protruding beyond it on all sides.

19. A security paper according to claim 17, wherein the security element is a transfer element applied to the surface of the security paper.

20. A security paper according to claim 19, wherein the security element has round, oval, star-shaped, rectangular, trapezoidal or strip-shaped contours.

21. A method for protecting goods from forgery comprising forming said goods with a security paper according to claim 16.

22. A document of value, wherein it has at least one security element according to claim 1.

23. A transfer material for producing the security element according to claim 1 comprising:

a carrier foil and at least one plastic layer on which at least two metal layers of different color are so disposed on the same side of the plastic layer that two different colors are visually recognizable and that the metal layers are disposed in one plane, side-by-side, and none of the metal layers overlaps another one of the metal layers.

24. A transfer material according to claim 23, wherein the plastic layer has a diffraction structure in the form of a relief structure.

25. A method for protecting goods from forgery comprising forming said goods with a transfer material according to claim 23.

26. A method for protecting goods from forgery comprising incorporating into said goods a security element according to claim 1.

* * * * *